United States Patent
Östman (10) Patent No.: US 6,738,370 B2
(45) Date of Patent: May 18, 2004

(54) METHOD AND APPARATUS IMPLEMENTING RETRANSMISSION IN A COMMUNICATION SYSTEM PROVIDING H-ARQ

(75) Inventor: Kjell Östman, Halikko (FI)

(73) Assignee: Nokia Corporation, Espoo (FI)

( * ) Notice: Subject to any disclaimer, the term of this patent is extended or adjusted under 35 U.S.C. 154(b) by 195 days.

(21) Appl. No.: 09/935,202

(22) Filed: Aug. 22, 2001

(65) Prior Publication Data

US 2003/0039229 A1 Feb. 27, 2003

(51) Int. Cl.⁷ .................................................. H04J 3/16

(52) U.S. Cl. ....................................... 370/349; 370/465

(58) Field of Search ................................ 370/465, 207, 370/338, 349; 375/279–281, 308, 329, 331–332, 261, 298, 340; 714/776, 748, 701

(56) References Cited

U.S. PATENT DOCUMENTS

| | | | | |
|---|---|---|---|---|
| 4,847,842 A | | 7/1989 | Schilling | 371/37 |
| 5,721,745 A | * | 2/1998 | Hladik et al. | 714/755 |
| 5,828,677 A | | 10/1998 | Sayeed et al. | 371/41 |
| 5,946,320 A | | 8/1999 | Decker | 370/428 |
| 6,208,663 B1 | | 3/2001 | Schramm et al. | 370/465 |
| 6,247,150 B1 | * | 6/2001 | Niemela | 714/701 |
| 6,308,294 B1 | | 10/2001 | Ghosh et al. | 714/751 |
| 6,366,601 B1 | * | 4/2002 | Ghosh et al. | 375/130 |
| 6,370,669 B1 | | 4/2002 | Eroz et al. | 714/774 |

OTHER PUBLICATIONS

3rd Generation Partnership Project; Technical Specification Group Radio Access Network; Physical Layer Aspects of UTRA High Speed Downlink Packet Access (Release 4), 3G TR25.848 V4.0.0, Mar. 2001; Valbonne, France.

TSG–RAN WG2 #21 meeting, Tdoc R2–011179, May 21–25, 2001; Busan, Korea.

Panasonic (2001); Enhanced HARQ Method with Signal Constellation Rearrangement, TSG–RAN WG1 #19, Feb. 27–Mar. 2, 2001, Las Vegas, USA.

3$^{rd}$ Generation Partnership Project; Technical Specification Group Radio Access Network; High Speed Downlink Packet Access: Overall UTRAN Description (Release 5), 3GPP TR 25.855 V0.0.8, Jun. 2001; Valbonne, France.

3$^{rd}$ Generation Partnership Project; Technical Specification Group Radio Access Network; Services provided by the physical layer (Release 4), 3GPP TS 25.302 V4.2.0, Sep. 2001; Valbonne, France.

Adaptive Modulation and Scheduling of IP Traffic over Fading Channels, Nilo Casimiro Ericsson, IEEE Vehicular Technology Conference—VTC'99–Fall, Amsterdam, The Netherlands, Sep. 19–22, 1999.

Adaptive Modulation and Scheduling of IP Traffic over Fading Channels, Nilo Casimiro Ericsson, IEEE, Vehicular Technology Conference—VTC'99–Fall, Amsterdam, The Netherlands, Sep. 19–22, 1999.

* cited by examiner

*Primary Examiner*—Min Jung
*Assistant Examiner*—Andy Lee
(74) *Attorney, Agent, or Firm*—Ware, Fressola, Van Der Sluys & Adolphson, LLP (57) ABSTRACT

An apparatus and corresponding method for responding to a repeat request in a wireless communication system in which packets are communicated according to a modulation and coding scheme, with one or more packets provided in a frame communicated during a transmission time interval, the method including the steps of: if a repeat request is received, then ordering in a second order the bits of the packets associated with the repeat request, and repeating the steps up to and including retransmitting the packets associated with the repeat request; wherein in the second order, the symbols constituting the modulation are generated differently than in the original transmission.

28 Claims, 5 Drawing Sheets

Fig. 1

Prior art

Original TTI and $(I_{re\text{-}Tx} \bmod 2) = 0$ $(I_{re\text{-}Tx} \bmod 2) = 1$

METHOD AND APPARATUS IMPLEMENTING RETRANSMISSION IN A COMMUNICATION SYSTEM PROVIDING H-ARQ

FIELD OF THE INVENTION

The present invention relates to wireless communication, such as provided by systems as specified in 3GPP (Third Generation Partnership Project) Wideband Code Division Multiple Access (WCDMA) release 5, High Speed Downlink Packet Access (HSDPA), but also as provided by other kinds of wireless communications systems. More particularly, the present invention relates to retransmitting via a wireless communication system a portion of a signal when the portion is received with an error; the invention is of use in applications in which both forward error correction and automatic retransmission request are implemented.

BACKGROUND OF THE INVENTION

To provide for higher data throughput in wireless communication systems, adaptive modulation and coding schemes (MCSs) are used in which both the modulation complexity and (channel) coding complexity are varied in response to changing channel conditions. In some communication systems such as systems implementing HSDPA (high speed downlink packet access), the number of channelization codes (and so the number of channels) can also be varied in response to changing channel conditions. Modulation complexity and channel coding are changed based on rather rapidly changing channel conditions, whereas the number of channels are varied on the basis of a longer-term average, and depending on how much data is to be transmitted. Varying modulation complexity means varying the number of bits that are communicated per symbol (a given modulation complexity provides a set or constellation of symbols, with each symbol used to convey a bit string, the greater the number of symbols in the constellation, the longer the bit string conveyed by each symbol). Varying the coding complexity means, for example, varying the amount of redundancy included in forward error correcting the data to be transmitted. Varying the number of channelization codes means changing the number of channels multiplexed together by use of a code tree (ensuring that all channels remain orthogonal even while the number of channels is varied). The modulation complexity and the number of channelization codes can be adaptively optimized for instance as shown in copending, commonly-owned U.S. Provisional Application Serial No. 60/301,078 filed Jun. 26, 2001. Because the conditions of a wireless communication channel tend to change more often and more substantially than the conditions of a hard-wired channel, errors in communication are more likely. To address the problem of higher error rates (both bit error rates and symbol errorrates), wireless communication systems have implemented various coping mechanisms. One coping mechanism for non-real time data is so-called automatic repeat (retransmission) request (ARQ) protocol, whereby, if a received symbol is determined to have an error, the receiving system automatically requests retransmission of the symbol.
The Problem Addressed by the Invention Higher-order modulation complexities (higher-order compared to binary systems) include what are generally known as N-QAM (quadrature amplitude modulation) systems (such as e.g. 16-QAM and 64-QAM). N-QAM systems (and other higher-order complexities) convey multiple bits per transmitted symbol. It is inherent in any amplitude modulation system involving more than two symbols (including any N-QAM system for N greater than 2) that the symbol error probabilities are not all the same, i.e. the probability that a receiver will conclude that a symbol was received other than the actually transmitted symbol is different for different symbols. (See e.g. *Introduction to Communication Systems*, Third Edition, by Ferrel G. Stremler, Addison Wesley Publishing Co., 1990, section 9.5.) Depending on how bits are assigned to the modulation symbols of a coding scheme, the bit error probabilities may vary too, i.e. the probability of a receiver concluding that a 1 was received when a 0 was transmitted (i.e. the bit error probability for a zero) may be different than the probability of a receiver concluding that a 0 was received when a 1 was transmitted.

Figure 1:
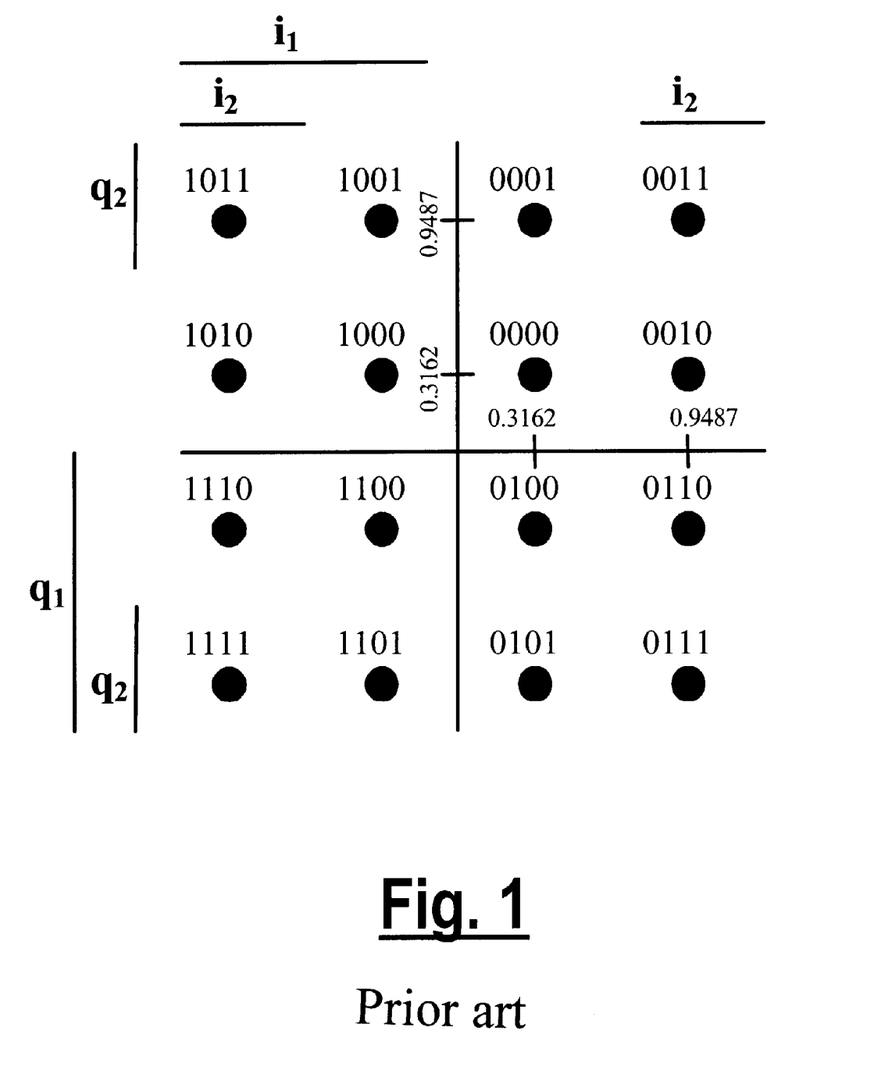
FIG. 1 is a graph of a signal constellation for 16 QAM.

For instance, in the symbol constellation diagram provided as FIG. 1, showing the constellation currently proposed for high speed downlink packet access (HSDPA), it can be seen that the first two bits are the same for each of the four symbols in any of the four quadrants; in the first quadrant, for example, the first two bits for each symbol are 00. On the other hand, in all of the four quadrants, the last two bits are always 11 in the corner symbols, while they are 00 in the innermost symbols. Consequently, a corner symbol being incorrectly mistaken for an innermost symbol occurs with a different frequency than an innermost symbol being mistaken for a corner symbol. Therefore, a bit having a value of 1 being incorrectly detected as having a value of 0 occurs with a different frequency than a bit having a value 0 being incorrectly detected as having a value of 1. Thus, the bit error probabilities for this constellation are different for 0's and 1's.

The notations $i_1$, $i_2$, $q_1$, $q_2$ in FIG. 1 represent the bits in the group constituting a modulation symbol; the bits are in the order $i_1 q_1 i_2 q_2$. A bar under or beside one of the notations (either $i_1$, $i_2$, $q_1$, or $q_2$) indicates where in the constellation diagram the bit indicated by the notation has the value "1" (i.e. the bar indicates all or part of the set of constellation points from which the modulation symbol is chosen if a particular bit is 1). For instance, if the bit $q_1=1$, then the symbol must be chosen from the set of points indicated by the bar beside $q_1$ in FIG. 1, and if $q_1=0$, then the symbol must be chosen from the complementary set of points.

A radio receiver has a limited dynamic range. If the modulation symbols have different amplitudes (of the same sign or phase), which indeed is the case in N-QAM modulation, a radio receiver will respond differently to the different symbols on account of their different amplitudes. For instance, the highest amplitude symbols might saturate the receiver, so that the receiver clips those symbols. On the other hand, because the smallest amplitude symbols might be smaller than the smallest quantization level, those symbols might be interpreted by a receiver as having a zero amplitude in the A/D-conversion. Clipping and zeroing are particularly noticeable in a fading channel, where the amplitude of the signal might vary from +10 dB (because of multipath constructive interference) to −40 dB compared to an unfaded signal.

In order to provide both a high data rate (in the downlink) and also reliability, for HSDPA it is proposed that what is termed H-ARQ (for hybrid automatic repeat requests) protocols be employed (at least for data transmission). In H-ARQ, a data packet that has been determined to be in error is retransmitted (when the receiver detects an error in the packet, based for example on some form of simple parity check). The retransmitted packet is combined with the original packet prior to forward error correction (FEC)

decoding (in the user terminal receiver, prior to decoding the convolutional or Turbo code), thereby increasing the reliability of the (downlink) transmission.

In a system using either ordinary automatic repeat request (ARQ) or H-ARQ, if the symbols constituting the higher-order modulation system are generated identically in the retransmission and the original transmission, the bit error probabilities in the retransmission are identical to the bit error probabilities in the original transmission. The probability of an error recurring is therefore the same with each retransmission, all other things being the same as when the error first occurred.

Prior Art Solutions

Several H-ARQ techniques have been proposed in HSDPA to improve the likelihood that in case of an error in a packet, a retransmission of the packet will be error-free. The most straightforward is Chase combining, where the same data packet is retransmitted a number of times, and prior to decoding, the repeated transmissions of the coded packet are combined in some fashion. (There are different ways of Chase combining packets, according to the prior art; for example, the packets might be combined on the symbol level, or they might be combined on the soft bit level.)

Another H-ARQ technique is the so-called incremental redundancy (IR) technique, in which the data to be transmitted is encoded with, for instance, a ¼ FEC code. In the first transmission, only two bits out of the encoded four bits are transmitted per uncoded data bit (i.e. a bit not coded for FEC), and the received signal is decoded as a ½ FEC code. If deemed to be in error, the data packet is retransmitted, but with the remaining two encoded bits transmitted per each uncoded bit; the receiver then combines the original and the second transmission, and decodes the received data as a ¼ FEC code. Since the transmitted encoded bits are different in the different transmissions, the symbol constellations are also different. Hence, in the IR type H-ARQ, the bit error probabilities are different in the retransmissions. IR is believed to minimize the differences in the bit error probabilities. Thus, IR provides that, on average, the bit error probabilities are the same, considering both the original transmission and the retransmission, i.e. when the bit error probabilities are calculated taking both the original transmission and retransmission into account.

There are serious drawbacks in IR compared to Chase combining. IR requires substantially more memory (twice as much), since the number of encoded bits that must be stored in the receiver is four with IR, compared to only two with Chase combining. IR also requires a more complicated FEC decoder, since with IR, the data is first decoded as a ½ code (i.e. via a convolutional coder with a ½ encoder rate) and then as a ¼ code.

What is needed is a way to minimize the bit error rate for systems employing higher-order modulation with forward error correction and either ARQ or H-ARQ, without the increased complexity of IR combining.

DISCLOSURE OF INVENTION

Accordingly, the present invention provides an apparatus and corresponding method for responding to a repeat request in a wireless communication system in which packets are communicated according to a modulation and coding scheme, each packet encompassing a string of bits, with one or more packets provided in a frame communicated during a transmission time interval, the method including the steps of: accumulating the packets to be conveyed in the next transmission time interval; ordering the bits encompassed by the accumulated packets in a first order so as to provide a first string of bits; providing according to a modulation scheme and a coding scheme the bits so ordered to a process for generating a transmission signal, the modulation scheme providing a constellation indicating a mapping for different groups of a predetermined number of bits to different symbols; transmitting the transmission signal in a next transmission time interval; if a repeat request is received, then ordering the bits encompassed by the accumulated packets in a second order and repeating the method beginning with the step of providing according to a modulation scheme and a coding scheme the bits so ordered to a process for generating a transmission signal; wherein in the second order, the symbols constituting the modulation are generated differently than in the original transmission.

In a further aspect of the invention, the second ordering of the bits is such that the symbols in the modulation constellation are composed differently than in the original transmission. In a still further aspect of the invention, the second ordering of the bits is provided by rearranging the first ordering by transferring a predetermined number of bits of the first string of bits to the end of the first string of bits.

For example, the modulation could be 16 QAM and the predetermined number of bits could be two. In another still further aspect of the invention, the second ordering of the bits is provided by inverting some predetermined number of the last bits in each group of bits that constitutes a symbol. In yet another still further aspect of the invention, the original transmission includes a step of interleaving and the second ordering of the bits is provided using a different interleaving than in the original transmission. In yet even another still further aspect of the invention, the original transmission includes a step of interleaving and the second ordering of the bits is provided using a different data scrambling than in the original transmission.

In another further aspect of the invention, the second ordering of the bits is such that the bits to be retransmitted are mapped to symbols in such a manner that the decoded bit error rate is made smaller.

In yet another further aspect of the invention, in the original transmission, some bits are coded for forward error correction and some are not, and the bits coded for forward error correction are mapped to modulation symbols using a mapping that is not necessarily the same as the mapping used to map to modulation symbols the uncoded bits (which is preferably by Gray encoding), and in the retransmission, the second ordering of the bits is provided using a different symbol mapping, compared to the symbol mapping used in the original transmission, for either the uncoded bits or the bits coded for forward error correction.

In still yet even another further aspect of the invention, in the original transmission, no bits are coded for forward error correction and all bits are mapped to modulation symbols using a first symbol mapping, and in the retransmission, all of the bits are coded for forward error correction, and the second ordering of the bits is provided using a different symbol mapping, compared to the symbol mapping used in the original transmission.

An advantage of the present invention is that it provides (overall) bit error probabilities comparable to those provided with IR H-ARQ, but with less complexity.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention will now be described in an application to a Wideband Code Division Multiple Access (WCDMA) communication system implementing hybrid automatic repeat request (H-ARQ) with high-speed downlink packet access (HSDPA), as set out in 3GPP (Third Generation Partnership Project) WCDMA release 5, HSDPA. It should be understood, however, that the invention is not limited in its application to the particular context used here to describe the invention. The invention is intended to be of use in any wireless communication system implementing one or another type of automatic repeat request (ARQ) protocol, so that the invention is more readily of use in data communications (via packet-based data communication systems), but would also be of use in voice communication systems (using packets) where the occasional latency inherent in an ARQ communication system is acceptable.

Figure 2A:
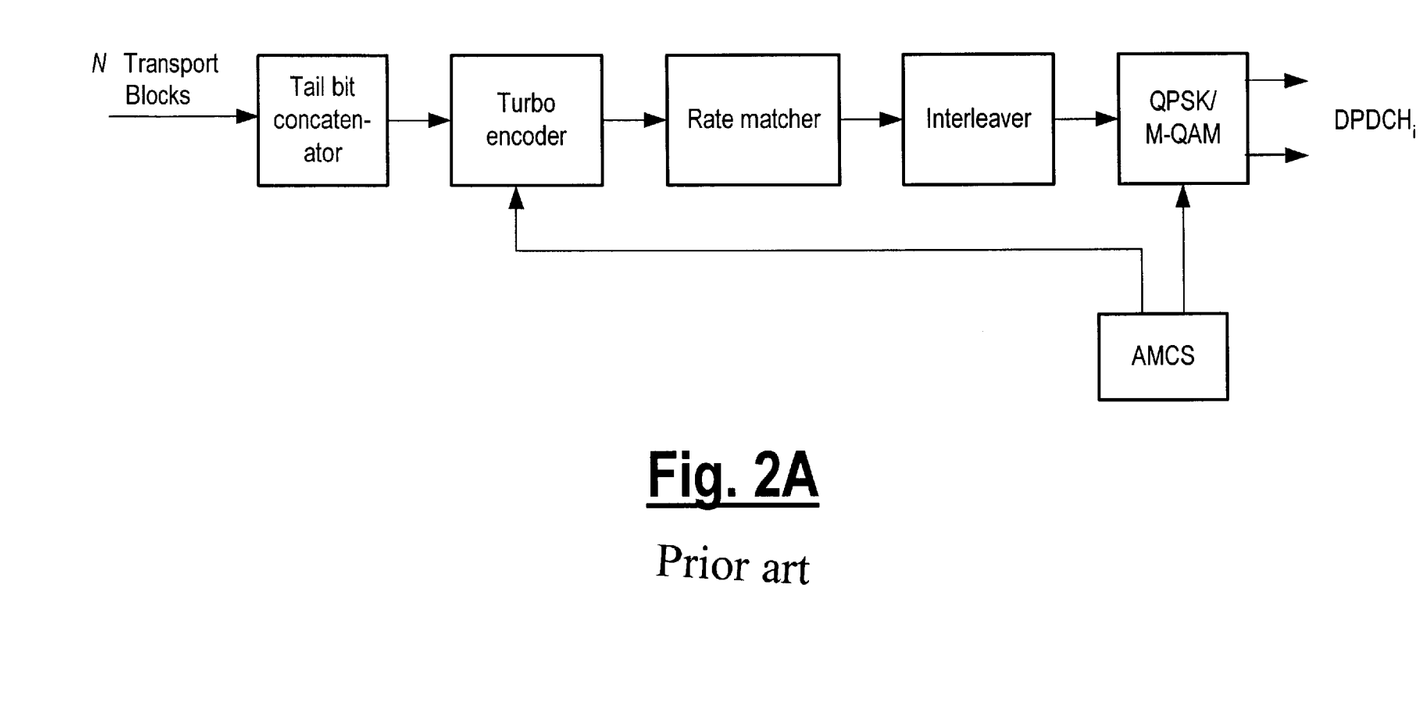
FIGS. 2A and 2B are high-level block diagrams of a typical digital modulator system for a WCDMA radio base station.

Referring now to FIG. 2A, a portion of a digital modulator system of the type for which the present invention could be used is shown as including several modules; in particular, what is shown are the modules of a downlink transmitter in the case of HSDPA. A tail bit concatenator module concatenates the bits to be transmitted (the transport block) with other bits used in the encoding process, the other bits being called tail bits. Next, a turbo encoder encodes m input bits into n encoded bits, the ratio of m to n depending on the coding rate used by the turbo encoder (so that e.g. for an encoding rate of ½, each input bit is encoded into 2 output bits).

Next, a rate matching block matches the number of bits to be transmitted to the physical channel capacity, by either puncturing some of the encoded bits (i.e. eliminating some of the redundant bits) or appending dummy bits to the encoded bits. For instance, suppose that we can fit 1000 bits into a TTI, but the encoded transport block consists of 1004 bits. The rate matching block then simply discards (i.e. punctures) four bits according to a predetermined rule. If, on the other hand, the encoded transport block consists of 996 bits, the rate matching block adds four bits according to a predetermined rule.

Next, an interleaving block shuffles the bits in a predetermined manner. Finally, a QPSK/M-QAN block (i.e. a block performing quaternary phase shift keying or, alternatively, M-ary quadrature amplitude modulation, whether QPSK or M-QAM is used being determined by an adaptive modulation and coding scheme module) takes a group of bits and maps them into a modulation signal constellation. Typically a QPSK/M-QAM block is used for the mapping into a modulation signal constellation and so the output of the mapping is typically a complex signal; however, the invention could also be applicable to a multi-level real-valued modulation, such as M-PAN (M-ary pulse amplitude modulation, with M>2) in place of the Q-QAM modulation, in which case the last block would be a QPSK/M-PAM module and so would sometimes provide a real output. (Of course the invention is also applicable to arrangements in which adaptive modulation and coding is not used. In such arrangements, the QPSK/M-QAM module or the QPSK/M-PAN module would be purely an M-QAM module or an M-PAM module. The invention could also be used with a pure QPSK modulation, but would offer no advantage unless the QPSK modulation were non-symmetric, i.e. unless the pairs of bits were mapped to the modulation symbols so that for example bit pairs in which the second bit is a zero are on the average closer to the origin than bit pairs in which the second bit is a one.) As indicated in FIG. 2A, the particular modulation and coding scheme used is specified by an adaptive modulation and coding scheme (AMCS) block, which controls the encoding used by the turbo encoder and the modulation used by the modulation mapper (the modulation mapper being indicated as the QPSK/M-QAN block in the FIG. 2A). The process indicated in FIG. 2A is performed for each so-called dedicated physical data channel (DPDCH) and for the (single) dedicated physical control channel (DPCCH) associated with all of the different data channels; in FIG. 2A, the process is indicated as being used in providing data intended for the ith DPDCH. The process of FIG. 2A is slightly different for the control channel: convolutional encoding is used instead of Turbo coding, no rate matching is used since the rate is constant, and no adaptive modulation and coding (AMC) is used. Therefore, no control channel is indicated in FIG. 2A. The process in FIG. 2B (described next) is the same for the control channel and the data channels.

Figure 2B:
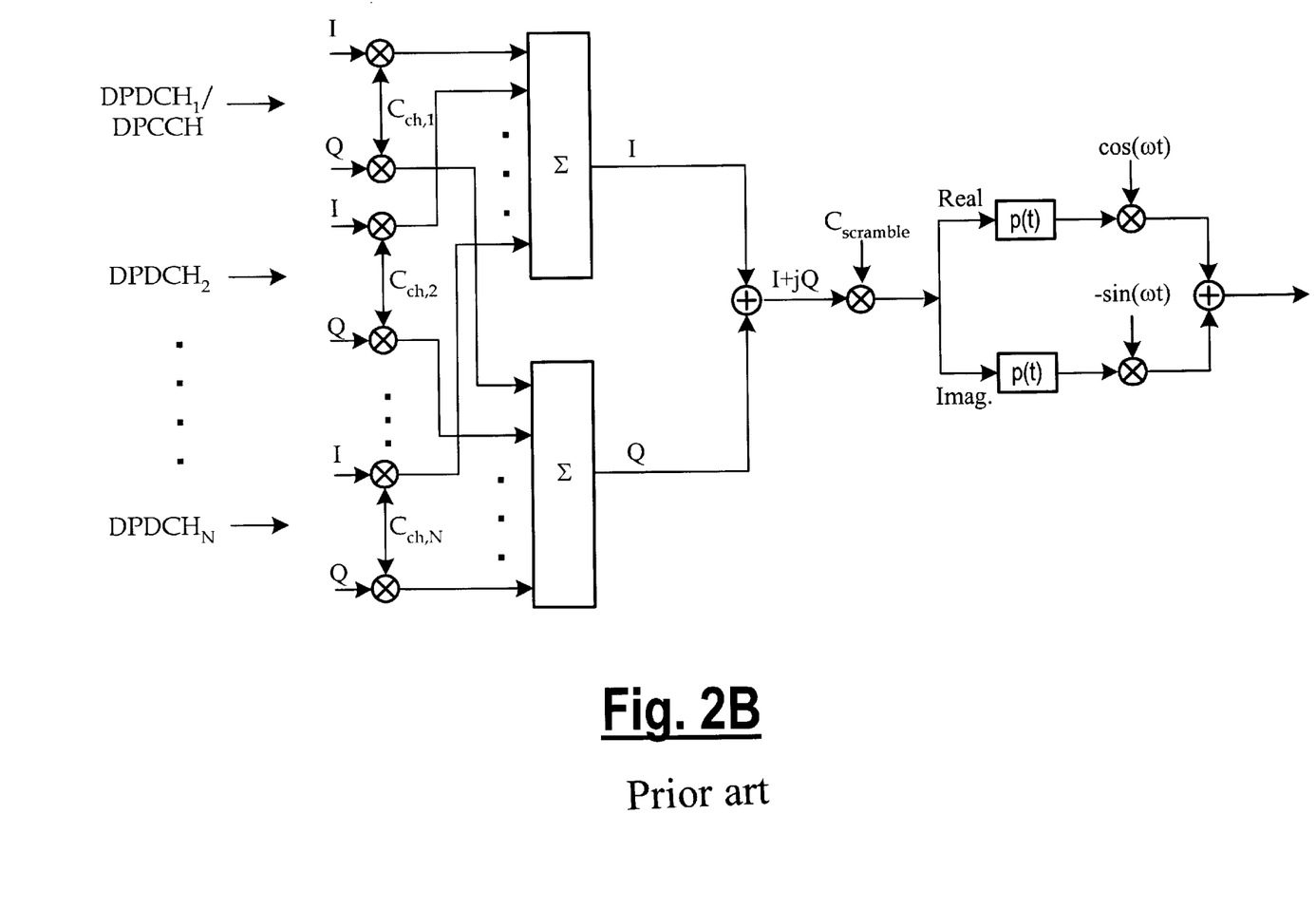

Referring now to FIG. 2B, the output signal of the modulation mapper intended for a given DPDCH or for the DPCCH (the output assumed here to be a complex signal, represented by an in-phase or I component and a quadrature phase or Q component) is multiplied by a channelization code indicated as $C_{ch,1}, C_{ch,2}, \ldots, C_{h,N}$ (usually a Walsh code) to provide orthogonalization with respect to the other channels. (The system may transmit information on one or more channels.) Next, the channels are summed and multiplied with a complex-valued scrambling code $C_{scramble}$. The I and Q components of the signal are then pulse-shaped in pulse-shaping filters p(t) and modulated by a complex RF carrier. (At some point in the overall process, the signal is also digital-to-analog converted, typically after the pulse-shaping filter and prior to modulation by the RF carrier.)

In the context of HSDPA, a TTI is a packet. (A TTI is a yet to be prescribed number of slots, probably somewhere between 1 and 15.) In case of an error detected via a CRC check, what is retransmitted is an entire TTI. Thus, if a mobile detects an error in a packet (TTI), it sends a repeat request, identifying the packet (TTI), and the base then resends the entire identified packet (TTI).

A First Embodiment

According to a first embodiment of the invention, for a retransmission, the symbols in the modulation constellation are composed differently than in the original transmission, preferably in such a way that in the combined data estimates (i.e. in an average over both the original mapping and the remapping), the bit error probabilities are substantially identical, or at least their difference is made smaller.

Figure 3:
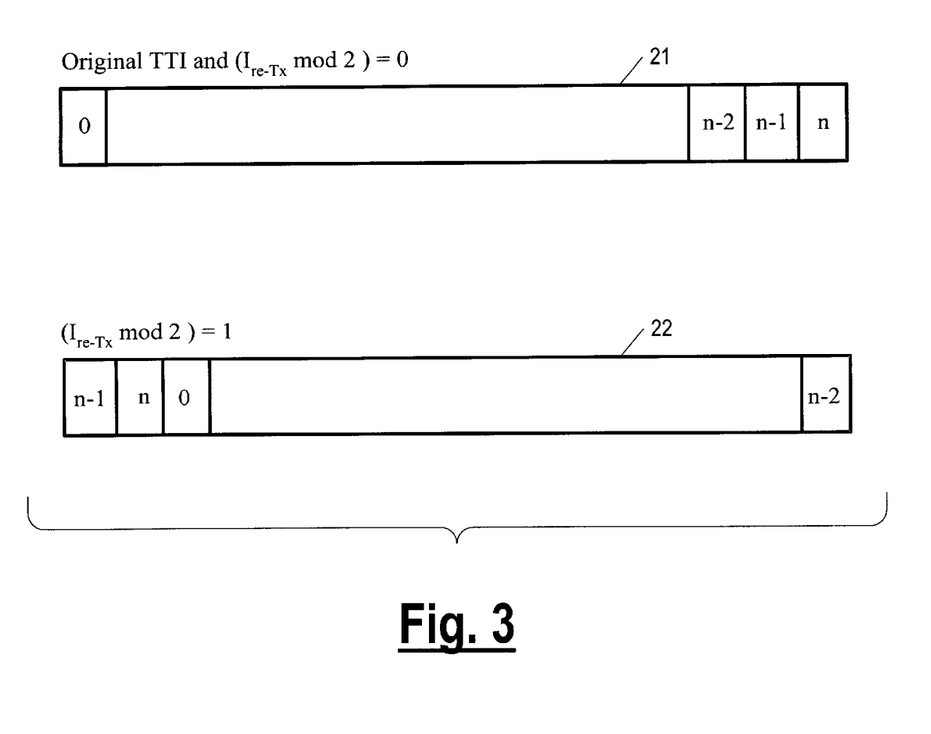
FIG. 3 is an illustration of an original transmission time interval (TTI) and retransmitted TTIs according to the invention.

Providing for an advantageous average of combined bit error probabilities can be achieved in several different ways. One way, for 16-QAM, is to invert the two last bits in each four-bit string corresponding to a different modulation symbol. A second way, illustrated in FIG. 3, is to offset by two bits the input bit stream to the N-QAM modulator. A third way is to employ a different interleaving in the retransmission. A fourth way is to employ different data scrambling in the retransmission. Each of these implementations of the first embodiment are described below.

Implementation of First Embodiment Based on Offsetting the Input to the Modulator in the Retransmission In FIG. 3, a data offset of two bits is used for successive retransmissions. More specifically, two bits from the beginning of an HSDPA transmission time interval (TTI) (a TTI being the time between consecutive deliveries of data between the medium access control (MAC) layer and the L1 transport layer) are transferred to the last two positions every other retransmission ($I_{re-Tx}$). (It is assumed for purposes of this disclosure that during a TTI, a number of bits corresponding to an integral number of modulation symbols is conveyed. If the number of information bits does not correspond to an integral number of modulation symbols, dummy bits are inserted. For instance, if the number of (encoded) information bits is 17, then 3 dummy bits must be inserted for 16-QAM to make the total number of bits a multiple of 4.) Thus, the original TTI 21 (which is the same as for the second retransmission) is shown with bits n−1 and n in the last two positions; a first retransmitted TTI 22 is shown with the last two bits of the original TTI moved to the first two positions, i.e. an altered TTI 22 is retransmitted on the first retransmission. Using $I_{re-TX}$ to count the retransmissions (in response to a series of requests to repeat transmission of a particular TTI), whenever $I_{re-TX}$ mod 2=0, the original TTI 21 is retransmitted, and whenever $I_{re-TX}$ mod 2=1, the altered TTI 22 is retransmitted. With this procedure, the two-bit blocks are mapped to more and less reliable bits in the constellation every other retransmission time. This process randomizes the symbol error probability (SEP) for the first retransmission. Since having the same SEP in the retransmission is the worst that can be done, randomizing the SEP improves the likelihood of success of the retransmission. Equalizing the SEP (so as to be the same for all symbols) would be better still, and in fact the best that could be done. Equalizing the SEP is partially achieved in a direct way in a paper entitled Enhanced HARQ Method with Signal Constellation Rearrangement (author or authors unknown, but employees of Panasonic) published between Feb. 27 and Mar. 2, 2001, as well as in some of the above-described embodiments of the invention. An indirect way is to repeat some kind of randomizing so many times (retransmissions) that the SEP is completely randomized (so that the SEP is the same for each symbol).

It should be emphasized that simply moving the last two bits back and forth, or simply continuing to shift the packet by two bits for each retransmission, would not continue to randomize the SEP; instead, the error probability would be deterministic. In the invention, the shifting (bit moving) can be done either before or after interleaving. If the bit shifting is done before interleaving, then we keep shifting the bits by two positions, so that the interleaving will be different and thus randomize the SEP. If the bit shifting is done after interleaving, then we can simply shift the last two bits back and forth. If the bit shifting is done after interleaving, then shifting by 2 will randomize the first retransmission; either repeating the shifting or, alternatively, shifting the 2 bits back to the original position will not yield any further randomizing effect. The result of the bit shifting before the interleaving with each subsequent retransmission being for a further shifted bit stream leads to a result that is similar to what is achieved by an implementation of the first embodiment in which a different interleaving is employed in each subsequent transmission in response to an automatic retransmission request.

It should also be pointed out that moving one bit also works, but moving two bits is preferable because, at least for a corner point in the constellation, moving two bits reduces the probability to 25% that the two bits with the '1' value will still occupy a corner position in the constellation. Consider a corner point in the original transmission, i.e. a point of the form bb11. If we shift by 1, the new bit group will be xbb1, and so the probability that the point is still a corner point is 50% (since b is 0 and 1 with equal probability). On the other hand, if we move by two, the new bit group will be 11yy, and so there is only a 25% probability that the two bits with the "1" value will be in a corner point. Thus, moving two bits is preferable, but moving one bit does improve the likelihood of success of a retransmission. For 16 QAM, moving three points is also an option, but is expected to produce the same gains as moving one point. (For 16 QAM, moving four points is the same as not moving any points if the moving is done after the interleaving.) What is preferable is believed to depend on the number of modulation, i.e. the number of bits per symbol. Thus, for 64 QAM, which encodes 6 bits per symbol, it is believed that moving three bits would be most effective, but that moving other numbers of bits would also yield an improvement in the likelihood of success of a retransmission.

Implementation of First Embodiment Based on Inverting the Last Two Bits of Each Symbol in the Retransmission In the second implementation of the first embodiment, the base station inverts the last two bits in each 4-bit group constituting a modulation symbol. Hence, a group that in the original transmission was xx11 and so was mapped to the corner constellation point, will in the retransmission become xx00 and be mapped into the innermost point of the constellation diagram. In the receiver, after the symbol-to-bit detection, the bits are re-inverted prior to packet combining and decoding. In some prior art, notably the above-referenced paper by employees of Panasonica (entitled Enhanced HARQ Method with Signal Constellation Rearrangement), the bits to be transmitted are unchanged but the bit-to-symbol mapping is changed between the original transmission and the retransmission; in the present invention according to this implementation, on the other hand, the bits to be transmitted are changed but the bit-to-symbol mapping remains the same between the original transmission and the retransmission.

Implementation of First Embodiment Based on Using Different Interleaving in the Retransmission In a third implementation of the first embodiment, a different interleaving is employed in the retransmission. In a mobile radio channel errors tend to occur in bursts, typically because of fast fading. On the other hand, convolutional codes and Turbo codes operate best if errors are occasional. For this reason, interleaving is applied in a retransmission (in case of an error) in a way that changes the order of the bits compared to the order in the original transmission (in which an error occurred). The order is changed back in the receiver, i.e. de-interleaving is applied, prior to decoding. If the channel causes a burst of errors, errors will occur on adjacent bits of the interleaved bit sequence. However, with de-interleaving, the errors are spread out over the bit sequence and so appear to be occasional to the receiver; convolutional codes and Turbo codes can then be used to attempt to correct the errors, and the likelihood of success will be higher because the errors are occasional, not bursty.

For higher-order modulation, interleaving will also reorder how the bits are grouped in the bit-to-symbol mapping. Therefore, by applying a different interleaving in the retransmission with respect to the first transmission, the whole symbol sequence will be different in the retransmission. In general, this will cause the bits to have different error probabilities in the retransmission than in the first transmission, which as explained earlier, will tend to equalize the bit error probabilities.

The interleaving for the retransmission might even be optimized, such that bits that are expected to have a higher bit error probability in the first transmission, are made to have a smaller bit error probability in the retransmission by shifting them to positions of bits that are expected to have a higher bit error probability, and vice versa.

In some implementations, if more than one retransmission is needed, each subsequent retransmission uses a new interleaving scheme.

Implementation of First Embodiment Based on Using Different Data Scrambling in the Retransmission In a fourth implementation of the first embodiment, a different data scrambling is used in the retransmission. The term scrambling is used here to mean any predetermined alteration of the bit values in the base station transmitter, the alteration being reversed in the UE receiver. Such an alteration could for example be accomplished by multiplying the bit values by a PN (pseudonoise) sequence.

A Second Embodiment

In the constellation of FIG. 1, the bit-to-symbol mapping has been done according to a procedure known as Gray encoding, which provides that between a given symbol point and its nearest neighbors, the fewest possible bits change sign. Such a mapping minimizes the bit error rate for uncoded bits.

However, in HSDPA the bits are always FEC-encoded, and typically the decoding is performed in a manner commonly known as soft decoding, where the probabilities of the bit values are input to the FEC decoder, rather than the bit values themselves.

Taking this into account, in a second embodiment of the invention, the encoded bits are mapped to symbols in such a manner that the decoded bit error rate is minimized (given that the input to the decoder is a combination of the original transmission and the retransmission). For 16-QAM, minimizing the decoded bit error rate can be achieved by swapping the innermost and outermost points in all quadrants. For example, if FIG. 1 represents the original bit-to-symbol mapping (so that bit group xx11 is mapped to a corner point), then in the retransmission the bit combination xx00 would be mapped to a corner point.

Further Embodiments

Usually, a different symbol mapping is performed when the bits to be transmitted are left uncoded (not forward error corrected) compared to when the bits to be transmitted are FEC-encoded; Gray encoding is typically used for symbol mapping for uncoded bits (i.e. for bits that are not FEC encoded). Sometimes, some bits are FEC encoded and some bits are not. In a third embodiment of the invention, in the original transmission, some bits are coded for forward error correction and some are not, and the bits coded for forward error correction are mapped to modulation symbols using a mapping that is not necessarily the same as the mapping used to map the uncoded bits to modulation symbols, and in the retransmission, a second ordering of the bits is provided and a different symbol mapping is used, compared to the symbol mapping used in the original transmission, for either the uncoded bits or the bits coded for forward error correction.

In a fourth embodiment, in the original transmission, no bits are coded for forward error correction and all bits are mapped to modulation symbols using a first symbol mapping, preferably Gray encoding, and in the retransmission, all of the bits are coded for forward error correction, and the second ordering of the bits is provided using a different symbol mapping, compared to the symbol mapping used in the original transmission. For example, in a system employing variable adaptive modulation and coding, for a particular modulation at least one of the coding schemes is uncoded, and at least one coding scheme employs FEC. In the original transmission, all of the bits are uncoded and a first bit-to-symbol mapping (preferably Gray encoding) is used in providing modulation by the bits, and in a retransmission in case of a negative acknowledgement, all of the bits are FEC encoded and a second bit-to-symbol mapping is used in providing modulation by the bits. The second bit-to-symbol mapping could be any mapping, as long as it differs from the uncoded mapping. What is preferable as the mapping for the coded bits is believed to depend on the mapping used for the uncoded bits.

The Invention Generally

Figure 4:
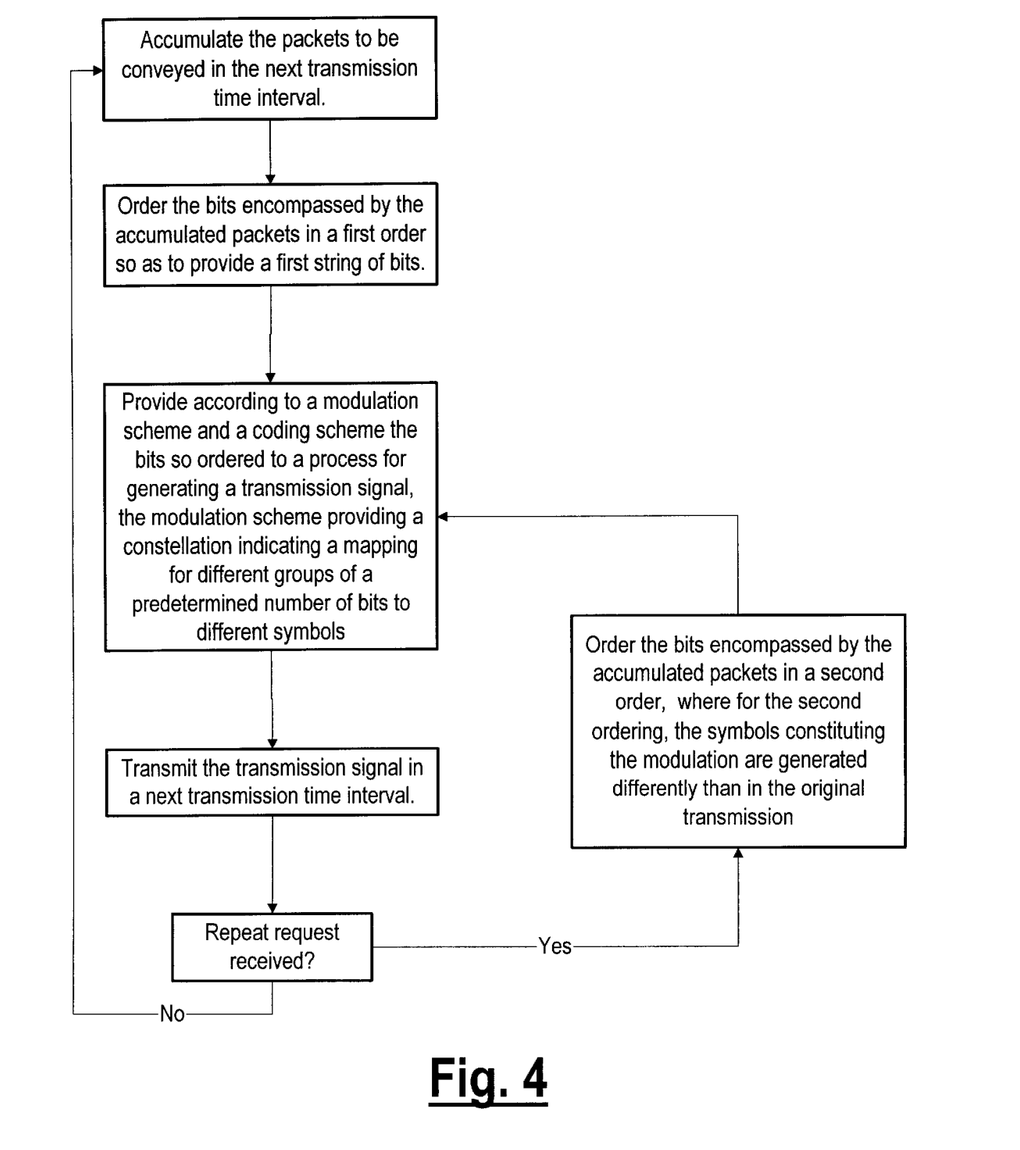
FIG. 4 is a flowchart illustrating a method according to the invention for responding to a repeat request in a wireless communication system.

FIG. 4 is a flowchart indicating steps of a method according to the invention for responding to a repeat request in a wireless communication system in which packets are communicated according to a modulation and coding scheme, each packet encompassing a string of bits, with one or more packets provided in a frame communicated during a transmission time interval.

Scope of the Invention

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for use by a transceiver in a wireless communication system, the method for transmitting and then retransmitting one or more packets each encompassing a string of bits, the method comprising the steps of:
   a) accumulating the packets to be transmitted;
   b) ordering the bits encompassed by the accumulated packets so as to provide a first string of bits as an ordered string of bits;
   c) generating a transmission signal corresponding to the ordered string of bits according to a modulation scheme indicating a mapping for different groups of a predetermined number of bits to different symbols;
   d) transmitting the transmission signal;
   e) if a repeat request is received, then providing a second string of bits corresponding to the bits encompassed by the accumulated packets but differing from the first string of bits, and repeating the method beginning with step c) using the second string of bits as the ordered string of bits.

2. A method as in claim 1, wherein the second string of bits is provided so that in an average over both the mapping of the first string of bits and the mapping of the second string of bits, a difference in bit error probabilities for at least two different bit positions is made smaller.

3. A method as in claim 2, wherein the second string of bits is provided by rearranging the first string of bits by transferring a predetermined number of bits of the first string of bits to the end of the first string of bits.

4. A method as in claim 3, wherein the modulation is 16 QAM and the predetermined number of bits is two.

5. A method as in claim 2, wherein the second string of bits is provided by inverting some predetermined number of the last bits in each group of bits that constitutes a symbol.

6. A method as in claim 5, wherein the modulation is 16 QAM and the predetermined number of bits is two.

7. A method as in claim 2, wherein a step of interleaving is performed and the second string of bits is provided using a different interleaving than is used for the first string of bits.

8. A method as in claim 2, wherein a step of data scrambling is performed, and the second string of bits is provided using a different data scrambling than is used for the first string of bits.

9. A method as in claim 1, wherein any bits of the second string of bits encoded for forward error correction mapped to symbols in such a manner that the decoded bit error rate is made smaller in case of decoding using as an input a combination of a transmitted signal corresponding to the first string of bits and a transmitted signal corresponding to the second string of bits.

10. A method as in claim 1 some bits of the first string of bits are coded for forward error correction and some are not, and the bits coded for forward error correction are mapped to modulation symbols using a mapping that is not necessarily the same as the mapping used to map to modulation symbols the uncoded bits, and for the second string of bits a different symbol mapping is used for either the uncoded bits or for the bits coded for forward error correction compared to the respective symbol mappings used for the uncoded and coded bits of the first string of bits.

11. A method as in claim 10, wherein the symbol mapping for uncoded bits is provided using Gray encoding.

12. A method as in claim 1, wherein no bits of the first string of bits are coded for forward error correction and all bits of the first string of bits are mapped to modulation symbols using a first symbol mapping, and all of the bits of the second string are coded for forward error correction, and the second string of bits is mapped to modulation symbols using a different symbol mapping compared to the symbol mapping used to map the first string of bits to modulation symbols.

13. A method as in claim 12, wherein the symbol mapping for the uncoded bits of the first string of bits is provided using Gray encoding.

14. An apparatus for use by a transceiver in a wireless communication system, the apparatus for transmitting and then retransmitting one or more packets each encompassing a string of bits, the apparatus comprising:
  a) means for accumulating the packets to be transmitted;
  b) means for ordering the bits encompassed by the accumulated packets so as to provide a first string of bits as an ordered string of bits;
  c) means for generating a transmission signal corresponding to the ordered string of bits according to a modulation scheme indicating a mapping for different groups of a predetermined number of bits to different symbols;
  d) means for transmitting the transmission signal;
  e) means, responsive to a repeat request, for providing as the ordered string of bits a second string of bits corresponding to the bits encompassed by the accumulated packets but differing from the first string of bits.

15. An apparatus as in claim 14, wherein the second string of bits is provided so that in an average over both the mapping of the first string of bits and the mapping of the second string of bits, a difference in bit error probabilities for at least two different bit positions is made smaller.

16. An apparatus as in claim 15, wherein the second string of bits is provided by rearranging the first string of bits by transferring a predetermined number of bits of the first string of bits to the end of the first string of bits.

17. An apparatus as in claim 16, wherein the modulation is 16 QAM and the predetermined number of bits is two.

18. An apparatus as in claim 15, wherein the second string of bits is provided by inverting some predetermined number of the last bits in each group of bits that constitutes a symbol.

19. An apparatus as in claim 18, wherein the modulation is 16 QAM and the predetermined number of bits is two.

20. An apparatus as in claim 15, further comprising means for interleaving and the second string of bits is provided using a different interleaving than is used for the first string of bits.

21. An apparatus as in claim 15, further comprising means for scrambling, and the second string of bits is provided using a different data scrambling than is used for the first string of bits.

22. An apparatus as in claim 14, wherein any bits of the second string of bits encoded for forward error correction are mapped to symbols in such a manner that the decoded bit error rate is made smaller in case of decoding using as an input a combination of a transmitted signal corresponding to the first string of bits and a transmitted signal corresponding to the second string of bits.

23. An apparatus as in claim 14, wherein some bits of the first string of bits are coded for forward error correction and some are not, and the bits coded for forward error correction are mapped to modulation symbols using a mapping that is not necessarily the same as the mapping used to map to modulation symbols the uncoded bits, and for the second string of bits a different symbol mapping is used for either the uncoded bits or for the bits coded for forward error correction compared to the respective symbol mappings used for the uncoded and coded bits of the first string of bits.

24. An apparatus as in claim 23, wherein the symbol mapping for uncoded bits is provided using Gray encoding.

25. An apparatus as in claim 14, wherein no bits of the first string of bits are coded for forward error correction and all bits of the first string of bits are mapped to modulation symbols using a first symbol mapping, and all of the bits of the second string are coded for forward error correction, and the second string of bits is mapped to modulation symbols using a different symbol mapping compared to the symbol mapping used to map the first string of bits to modulation symbols.

26. An apparatus as in claim 25, wherein the symbol mapping for the uncoded bits of the first string of bits is provided using Gray encoding.

27. A method as in claim 9, wherein the modulation is 16 QAM and so is based on a symbol constellation including in each quadrant an innermost symbol and an outermost symbol and is further based on a predetermined mapping of strings of four bits to each of the sixteen symbols, and the mapping used for the bits of the second string of bits differs from the mapping used for the corresponding bits of the first string of bits in that any string of four bits that is mapped to an outermost symbol in the mapping of the first string of bits is instead mapped to an innermost symbol in the mapping of the second string of bits, and vice versa.

28. An apparatus as in claim 22, wherein the modulation is 16 QAM and so is based on a symbol constellation including in each quadrant an innermost symbol and an outermost symbol and is further based on a predetermined mapping of strings of four bits to each of the sixteen symbols, and the mapping used for the bits of the second string of bits differs from the mapping used for the corresponding bits of the first string of bits in that any string of four bits that is mapped to an outermost symbol in the mapping of the first string of bits is instead mapped to an innermost symbol in the mapping of the second string of bits, and vice versa.

* * * * *

UNITED STATES PATENT AND TRADEMARK OFFICE
CERTIFICATE OF CORRECTION

PATENT NO. : 6,738,370 B2 Page 1 of 1
DATED : May 18, 2004
INVENTOR(S) : Kjell Östman It is certified that error appears in the above-identified patent and that said Letters Patent is hereby corrected as shown below:

Column 11,
Line 17, after "claim 1" insert -- wherein --.

Signed and Sealed this

Seventh Day of September, 2004

JON W. DUDAS
*Director of the United States Patent and Trademark Office*